UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

METHOD FOR THE PRODUCTION OF SILICON CARBID.

949,386. Specification of Letters Patent. Patented Feb. 15, 1910.

No Drawing. Application filed April 25, 1908. Serial No. 429,151.

*To all whom it may concern:*

Be it known that I, FRANK J. TONE, of Niagara Falls, in the county of Niagara, State of New York, have invented a new and useful Method for the Production of Silicon Carbid, of which the following is a specification.

Silicon carbid or carborundum produced by the methods heretofore employed is made by charging into an electric furnace around a central conducting core or carbon a mass of carbon in the form of ground coke mingled with sand, sawdust and common salt, passing the current through the core and generating thereby an intense heat which causes the silicon and carbon to combine and to produce a cylindrical zone of carborundum crystals.

The theoretical reaction according to which the process is carried on is the following:

$$SiO_2 + 3C = SiC + 2CO.$$

It has been the practice to use the ingredients of the charge mixture in substantially the following proportions by weight which afford a slight excess of carbon above that which is theoretically required: ground coke, 35.1%; sand, 54.4%; sawdust, 7%; common salt, 3.5%. The silicon carbid produced in this way occurs in the form of opaque crystals of various colors, the black predominating. Some of the crystals are blue and green, and some have iridescent surfaces showing colors of the spectrum.

I have discovered that silicon carbid can be produced in colorless transparent crystals which have great value in the arts because their index of refraction is very high, exceeding that of crown glass and the diamond, and in fact exceeding that of any known substance which is transparent to the whole visible spectrum. Such crystals also possess double refraction and are of great value as gems, for they can be cut with regular facets and polished. By selecting crystals of great depth in the direction of the optical axis they can be cut to form gems which utilize the property of double refraction, and by utilization of the great dispersion of the extraordinary ray and production of interference colors, they afford great brilliancy and beauty. I accomplish the manufacture of such transparent crystals of sufficient size to be utilized as gems and for optical purposes by making use, in a great measure, of a chemical reaction which has not been previously known to have any substantial bearing upon the formation of silicon carbid. In addition to the reaction by which silicon carbid is ordinarily supposed to be formed, which is expressed by the formula $$SiO_2 + 3C = SiC + 2CO,$$

I have discovered that there is another reaction of great importance in the formation of crystals of large size which is expressed by the following formula:

$$3Si + 2CO = 2SiC + SiO_2.$$

The reaction expressed by this formula is a gaseous reaction and takes place by virtue of the capacity of silicon to reduce carbon monoxid at certain temperatures below that at which silicon carbid dissociates into silicon and carbon. In accordance with this reaction the silicon combines with carbon monoxid, both existing as gases in the atmosphere of the interior of the carborundum furnace, and their combination results in the production of crystalline silicon carbid and silica in a volatile form. The silicon carbid thus produced builds up in large crystals, which start upon crystals initially formed by the direct union of the silicon and carbon of the charge mixture; and by prolonging the operation of the furnace, these crystals can be made to attain a large size. For this purpose the charge mixture should be constituted so as to afford spaces for the mingling and combining of the gases, and the temperature should be less than that at which carborundum dissociates. The necessary space for circulation of the gases is afforded by using sawdust in the charge mixture, preferably in a larger percentage than heretofore employed; and I have found that the proper temperature conditions are those which exist in the crystalline zone of a carborundum furnace just outside the carbon core.

In the preferable practice of my invention I make a carborundum furnace with a core of carbon preferably in the form of carbon granules, using for that purpose carbon which is free from contamination of metallic oxids. For this purpose I may use a carbon core taken from previous runs of a furnace, or I may prepare the core specially by subjecting it to electric heat, which will volatilize its contained oxids. I surround this core with a mixture of silica, ground carbon and sawdust or like material, preferably adding common salt as a flux, and employ the silica and carbon in a pure state, free from metallic oxids, the carbon being preferably petroleum coke or ground coke which has been purified by chemical treatment or by heating in an electric furnace. I mix these in such proportion that the silica will be somewhat in excess of the amount theoretically required by the formula $$SiO_2 + 3C = SiC + 2CO.$$

These proportions by weight are attained by the following mixture: Ground carbon, 30%; silica, 57%; sawdust, 9%; common salt, 4%. I then subject the furnace containing such charge mixture to an electric current passed through the core, generating heat of the same degree as that now utilized in the manufacture of carborundum, but I continue the operation for such time that the zone of carborundum crystals adjacent to the core is decomposed to a considerable thickness, preferably to an extent of two or three inches. The decomposition of these crystals results in the liberation of silicon vapor, which combines with the carbon monoxid gases in the furnace and builds up large crystals of carborundum just outside the zone of graphite which is formed by the decomposition. The crystals thus produced are clear and transparent, being free from coloration, and can be made of a large size.

It is important that the carbon of the charge should not be in excess, since otherwise the crystals produced are apt to be black; but with care in the composition of the charge and the provision of the spaces for the gaseous reaction and by proper continuation of the time of the reaction, I am enabled to produce satisfactorily large, clear crystals of great commercial value.

By adding to the charge mixture a small percentage of suitable coloring material the crystals can be tinted without destroying their transparency. For this purpose I may use oxid of chromium or oxid of manganese. These coloring oxids should be added only in small amount, say not more than one-half of one per cent. of the total charge.

The invention is capable of modification by those skilled in the art; and by the description of the preferred details of practice of the process I do not intend to limit thereto the broad claims of this specification, since

What I claim is:

1. The method herein described of producing transparent crystals of silicon carbid, which consists in subjecting a mixture of silica and carbon substantially free from natural impurities to electrically developed heat, forming thereby crystalline silicon carbid, and prolonging the operation sufficiently to form silicon vapor and to permit carbon monoxid and silicon vapor to combine as silicon carbid upon initially formed crystals, thereby building up transparent crystals of increased size.

2. The method herein described of producing transparent crystals of silicon carbid, which consists in subjecting a mixture of silica and carbon substantially free from natural impurities to electrically developed heat, forming thereby crystalline silicon carbid, and prolonging the operation for a sufficient length of time to cause substantial decomposition of the layer of silicon carbid adjacent to the zone of greatest heat and to permit carbon monoxid and volatile silicon to combine as silicon carbid upon initially formed crystals, thereby building up transparent crystals of increased size.

3. The method herein described of producing transparent crystals of silicon carbid, which consists in subjecting to electrically developed heat a mixture of silica and carbon, substantially free from natural impurities, and in such proportions that the silica is in excess of the amount required by the equation $SiO_2 + 3C = SiC + 2CO$, forming thereby crystalline silicon carbid, and prolonging the operation sufficiently to form silicon vapor and permit carbon monoxid and silicon vapor to combine as silicon carbid upon initially formed crystals, thereby building up transparent crystals of increased size.

4. The method herein described of producing transparent crystals of silicon carbid, which consists in subjecting to electrically developed heat a mixture of silica and carbon substantially free from natural impurities, forming thereby crystalline silicon carbid, and prolonging the operation sufficiently to form silicon vapor and permit carbon monoxid and silicon vapor to combine as silicon carbid upon initially formed crystals, thereby building up transparent crystals of increased size and providing interstices for the circulation of gases within the charge.

5. The method herein described of producing transparent crystals of silicon carbid, which consists in subjecting to electrically developed heat a mixture of silica and carbon substantially free from natural impurities, forming thereby crystalline silicon carbid, and prolonging the operation sufficiently to form silicon vapor and permit carbon monoxid and silicon vapor to combine as silicon carbid upon initially formed crystals, thereby building up transparent crystals of increased size and providing interstices for the circulation of gases within the charge by admixture therewith of an excess of destructible interstitial matter.

In testimony whereof, I have hereunto set my hand.

FRANK J. TONE.

Witnesses:
CLARENCE D. KERR,
ANNA E. WALLACE.